United States Patent
Rosales

[11] 3,811,742
[45] May 21, 1974

[54] REDUNDANT BEARING

[75] Inventor: Joseph G. Rosales, Gardena, Calif.

[73] Assignee: Donald M. Ackley, Hermosa Beach, Calif.

[22] Filed: Nov. 13, 1972

[21] Appl. No.: 305,932

Related U.S. Application Data

[62] Division of Ser. No. 163,811, July 19, 1971.

[52] U.S. Cl. .............................................. 308/183
[51] Int. Cl. ........................................... F16c 19/00
[58] Field of Search .................................... 300/183

[56] References Cited
UNITED STATES PATENTS
1,769,933  7/1930  Arutaroff ........................... 308/183

Primary Examiner—Charles J. Myhre
Assistant Examiner—Frank Susko
Attorney, Agent, or Firm—William W. Haefliger

[57] ABSTRACT

A bearing assembly combinable with inner and outer coaxially relatively rotatable members annularly spaced apart comprises:
a. a ring in said space and spaced from said members to be rotatable relative thereto about said axis,
b. first inner and outer annular races respectively on the outer member and the ring and first rolling bearings engaging said first races, and second inner and outer annular races respectively on the inner member and the ring and second rolling bearings engaging said second races, and the races and bearings characterized in that loading is transmitted between said members via said races and bearings and
c. there being structure transmitting force acting to pre-load said races and bearings in an axial direction.

8 Claims, 7 Drawing Figures

3,811,742

REDUNDANT BEARING

This is a division of application Ser. No. 163,811, filed July 19, 1971.

BACKGROUND OF THE INVENTION

This invention relates generally to bearing assemblies, and more particularly concerns reduction of bearing wear and improvements in reliability of bearing units.

Undesirable wear and overheating of bearings is a continuing problem, especially in high rotary speed environments. Bearing seizure as a consequence of such wear or overheating is a further problem, and can result in catastrophic failure of a bearing assembly and of associated mechanism.

SUMMARY OF THE INVENTION

It is a major object of the invention to provide solutions to the above problems, and characterized by reduced wear, lessened heat development, and avoidance of catastrophic failure.

Basically, the invention embodies a bearing assembly adapted for combination with coaxially relatively rotatable members which are annularly spaced apart, and comprising:

a. a ring in said space and spaced from said members to be rotatable relative thereto about said axis, b. first inner and outer annular races respectively on the outer member and the ring and first rolling bearings engaging said first races, and second inner and outer annular races respectively on the inner member and the ring and second rolling bearings engaging said second races, and the races and bearings characterized in that loading is transmitted between said members via said races and bearings, and c. there being structure transmitting force acting to pre-load said races and bearings in an axial direction.

As will be seen, the bearings may comprise axially spaced ball groups toward which the races are annularly concave and angled to transmit the pre-loading force; the ring may have Z shape in axial radial planes, or other equivalent configuration; and the ring may include two sections which are relatively axially movable, in response to pre-loading force transmission.

These and other objects and advantages of the invention, as well as the details of illustrative embodiments, will be more fully understood from the following description and drawings, in which:

DRAWING DESCRIPTION

DETAILED DESCRIPTION

Figure 1:
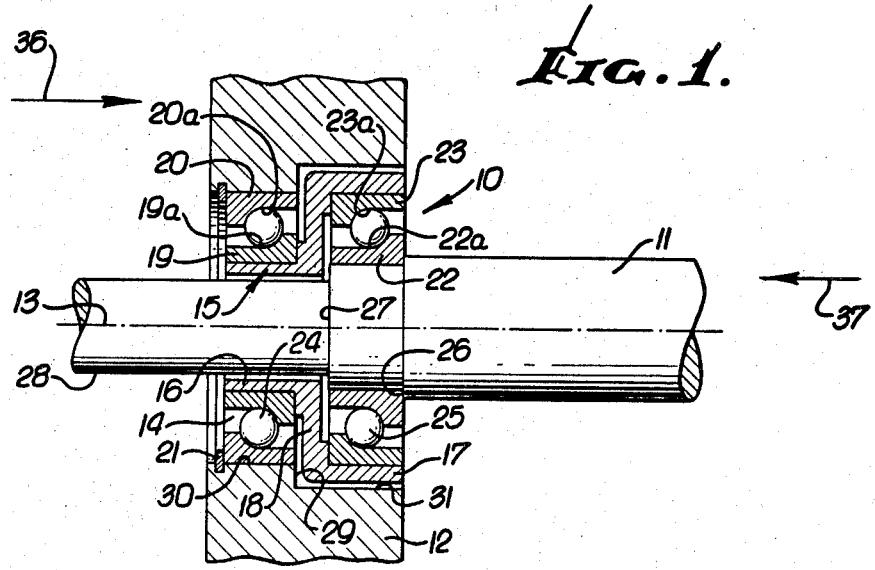
FIG. 1 is an elevation taken in section.

In FIG. 1, an anti-friction bearing assembly 10 is shown in combination with inner and outer relatively rotatable members, as for example shaft 11 and housing 12, the bearing assembly and shaft being coaxial with respect to axis 13.

A ring is located in the space 14 between the inner and outer members 11 and 12 to be rotatable relative thereto about axis 13. The illustrated stepped ring 15 is generally Z-shaped in axial radial cross section, and includes an inner cylindrical part 16, an outer cylindrical part 17 and an interconnecting annular part 18.

First inner and outer annular races are respectively provided on the outer member and the ring, and first rolling bearings are located to engage such first races. For example, first inner race 19 having bearing engaging surface 19a is carried by the ring part 16, and first outer race 20 having bearing engaging surface 20a is carried by the housing bore 30 and urged endwise leftwardly against the shoulder provided by snap ring 21. Similarly, a second inner race 22 having bearing engaging surface 22a is carried by the shaft 11, and a second outer race 23 having bearing engaging surface 23a is carried by the ring part 17. First bearing balls 24 engage race surfaces 19a and 20a, and second bearing balls 25 engage race surfaces 22a and 23a, balls 24 being circularly spaced about axis 13 as are balls 25. Also, all the balls have the same size. Accordingly, the races and bearings are characterized in that loading is transmitted between the members 11 and 12, for example to support shaft 11 in the position shown.

Structure is provided to transmit force acting to pre-load the races and bearings in an axial direction. For example, the bearing assembly 10 may be retained in endwise pre-loaded condition by the shoulder 26 on the shaft engaging race 22, and the engagement of snap ring 21 with race 20. Further, race surface 20a is annularly concave toward the right; race surface 19a is annularly concave to the left; race surface 23a is annularly concave to the right; and race surface 22a is concave to the left, all for the purpose of transmitting endwise loading between snap ring 21 and shaft shoulder 26, and via ring 15. Arrows 36 and 37 indicate opposite endwise loading on the shaft and housing to produce the referred to bearing transmitted endwise loading. Note also that shaft 11 has another shoulder 27 and a reduced circumference at 28, to closely receive ring part 16, and the housing member 12 has a shoulder 29 and a counterbore 31 to closely receive ring part 17.

As a result of the above, certain unusual advantages are achieved. These include the orientation of the duplexed bearing groups 24 and 25 in axially spaced relation with generally the same radii from axis 13, so that the balls of each group rotate about axis 13 at about half that speed at which only one group of balls would rotate. This greatly extends bearing ball and race life, especially in high speed environments. Also, if one group of balls and associated races fails (siezes, for example) during rotation, the other group takes over the task of full bearing support of the load, preventing catastrophic failure. Likewise, if one race of the duplexed pair encounters increased friction from heat or abrasion, the speed of that race will be reduced, as for example to a speed it can handle without causing further friction development. Accordingly, the bearing assembly may be characterized as sharing the load and dividing the speed between them.

Figure 2:
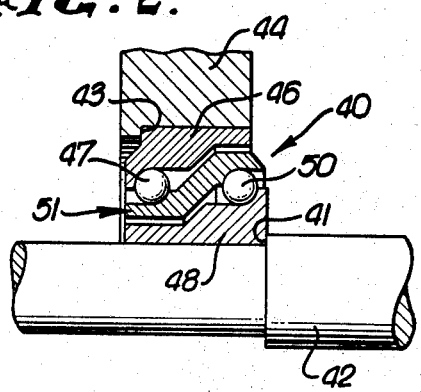
FIGS. 2–7 are elevations taken in section showing modifications.
Figure 3:
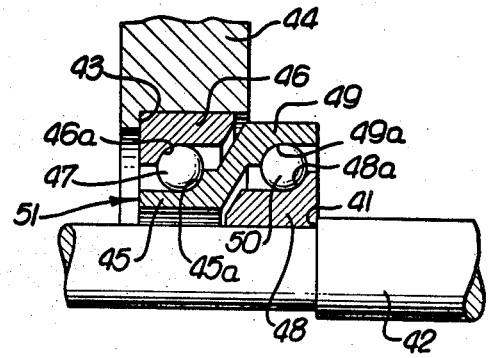
Figure 4:
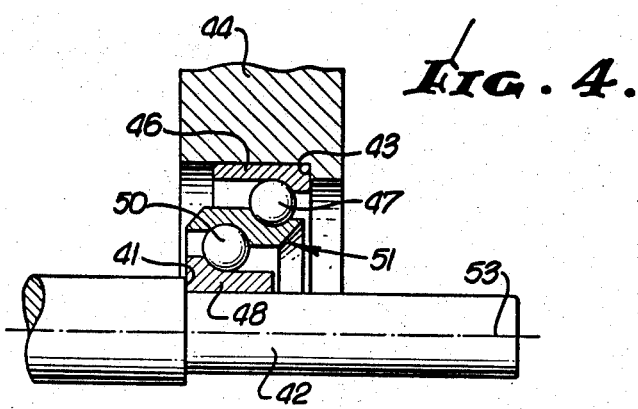

In each of the similar examples of FIGS. 2–4, a bearing assembly 40 is retained with endwise pre-loading between step shoulder 41 on shaft 42, and step shoulder 43 on the housing 44. First inner and outer races 45 and 46 have surfaces 45a and 46a engaging first bearing balls 47; and second inner and outer races 48 and 49 have surfaces 48a and 49a, respectively, engaging second bearing balls 50. Races 45 and 49 are, in this instance, integral with or part of Z-shaped ring 51 corresponding to ring 15 in FIG. 1. FIG. 3 differs somewhat from FIG. 2 in the axial length of the various races and ring configurations. In FIG. 4, the races and ring are somewhat differently shaped, and the positions of the shoulders 41 and 43 are endwise reversed as compared with FIGS. 2 and 3; also, the circular series of balls 47 is spaced further from the axis 53 than the circular series of balls 50.

Figure 5:
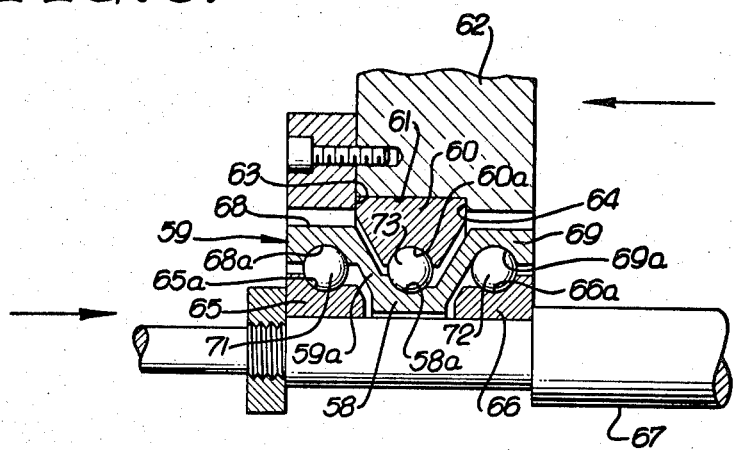
Figure 6:
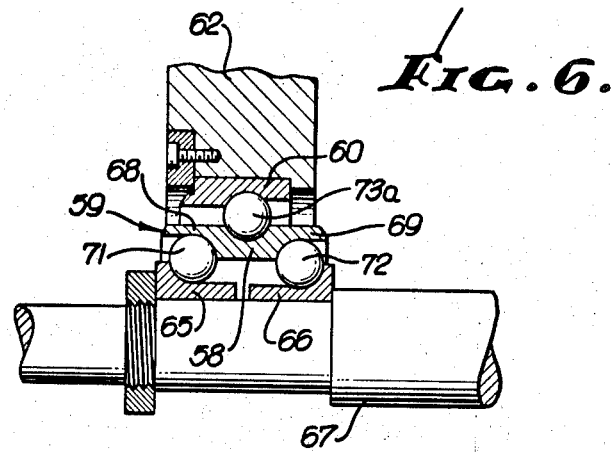
Figure 7:
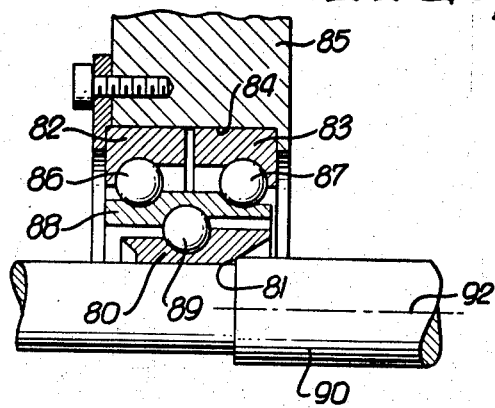

In each of FIGS. 5–7, the bearing balls are arranged in three groups, with radial loading shared by at least two of the groups, as will appear. For example, in FIG. 5, first inner race 58 having bearing engaging surface 58a is integral with section 59a of ring 59; and first outer race 60 having bearing engaging surface 60a is carried by bore 61 of housing 62, and retained between shoulders 63 and 64. Second inner races 65 and 66 having bearing engaging surfaces 65a and 66a are carried by shaft 67; and second outer races 68 and 69 having bearing engaging surfaces 68a and 69a are carried by (as for example are integral with) the ring sections 59a and 59b, respectively. Bearing ball group 71 is retained between surfaces 65a and 68a; ball group 72 is retained between surfaces 66a and 69a; and ball group 73 is retained between surfaces 58a and 60a.

The FIG. 6 arrangement is similar to that of FIG. 5, and therefore bears the same numerals applied to corresponding parts. Of principal difference is the location of the ball group 73a (corresponding to group 73 in FIG. 5) at a greater radial distance from shaft axis 76 than the radial distance of ball groups 71 and 72 from that axis, all distances measured to the centers of the same diameter balls.

In FIG. 7, race 80 is carried by the shaft 90 and loaded against step shoulder 81; spaced races 82 and 83 are carried at bore 84 of housing 85. Ball groups 86 and 87 share the radial load transmitted between the housing and the ring 88, and ball group 89 transmits radial loading between the ring and the shaft 90. Endwise loading exerted by the housing is indicated at 91. Groups 86 and 87 have the same radial dimension from the shaft axis 92, and which is greater than the radial dimension of ball group 89 from that axis.

I claim:

1. In combination with inner and outer relatively rotatable members which define annular space therebetween and have a common axis, a bearing assembly comprising, a. a ring in said space and spaced from said members to be rotatable relative thereto about said axis, b. first inner and outer annular races respectively carried on the outer member and the ring and first rolling bearings engaging said first races, and second inner and outer annular races respectively carried on the inner member and the ring and second rolling bearings engaging said second races, and the races and bearings characterized in that loading is transmitted between said members via said races and bearings, c. there being structure transmitting force acting to pre-load said races and bearings in an axial direction, and d. the inner member comprising a shaft having first and second radially solid cylindrical sections of successively increasing outer diameter, the ring and the first inner and outer races everywhere spaced radially outwardly of the shaft first cylindrical section, the second inner race received on the shaft first cylindrical section to receive transmission of said pre-loading force from the second section, and the first and second rolling bearings being axially spaced apart with centers located at substantially the same radius from said axis.

2. The bearing assembly of claim 1 wherein the bearings comprise balls and said races are concave toward the balls.

3. The assembly of claim 1 wherein said structure includes axially endwise facing shoulders on said members.

4. The assembly of claim 1 wherein said first and second rolling bearings are axially spaced apart with centers located at approximately the same radii from said axis.

5. The assembly of claim 1 wherein said races are angled to transmit said pre-loading force.

6. The assembly of claim 1 wherein said ring has Z-shaped configuration in axial radial cross section.

7. The assembly of claim 1 wherein said first inner race and said second outer race are defined by surface extents of said ring.

8. The assembly of claim 7 wherein said first outer race and second inner race are generally axially coextensive with said ring.

* * * * *